April 28, 1970     K. E. HUMBERT, JR., ET AL     3,508,383
AIR FILTER
Filed Feb. 15, 1968                                         2 Sheets-Sheet 1
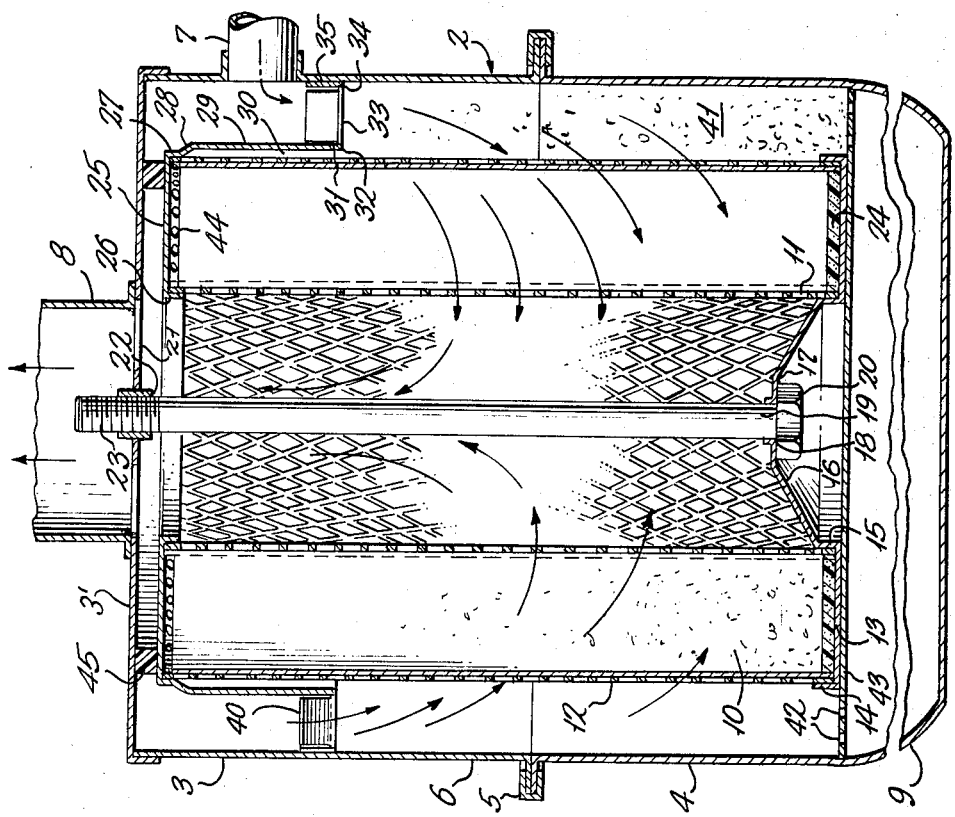
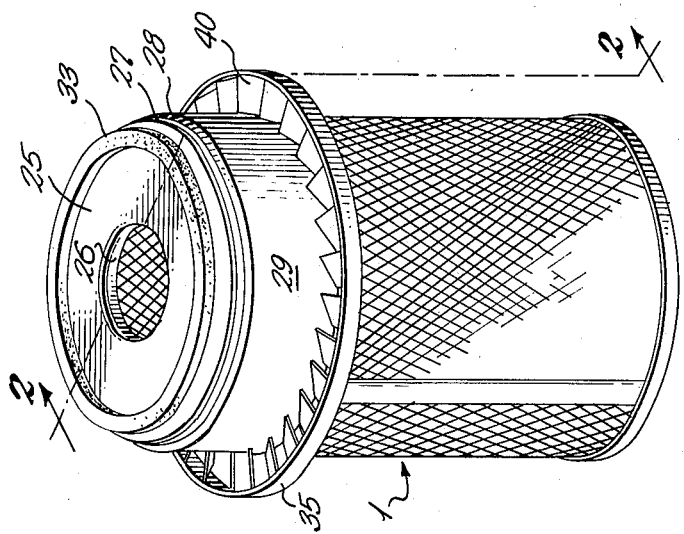
INVENTORS
Kingsley E. Humbert, Jr. &
Ernesto Buonpastore
BY
ATTORNEYS April 28, 1970  K. E. HUMBERT, JR., ET AL  3,508,383
AIR FILTER
Filed Feb. 15, 1968  2 Sheets-Sheet 2

INVENTORS
Kingsley E. Humbert, Jr. &
Ernesto Buonpastore
BY
Shoemaker and Mattare
ATTORNEYS

# United States Patent Office 3,508,383
Patented Apr. 28, 1970

3,508,383
AIR FILTER
Kingsley E. Humbert, Jr., Gastonia, and Ernesto
Buonpastore, Charlotte, N.C., assignors to Wix
Corporation, Gastonia, N.C., a corporation of
North Carolina
Filed Feb. 15, 1968, Ser. No. 705,844
Int. Cl. B01d 50/00
U.S. Cl. 55—337                                      6 Claims

ABSTRACT OF THE DISCLOSURE

An air filter including a deflector as an end cap of the filter unit including a skirt, a first flange extending outwardly thereof provided with blades and a second flange extending in the same direction as the blades being in engagement with the housing which will cause the air to swirl within the housing and to thus separate the heavy dust particles from the air by swirling action before the air passes through the filter media wherein the remainder of the dust particles are separated from the air, and the deflector being spaced from the filter media so that the same is exposed in its entirety to the flow of air.

---

The invention relates to air filters wherein air being drawn into or forced into a housing is caused to pass through a full flow filter media to remove the dirt and dust particles carried in the air whereby substantially clean air passes to the point of usage such as an internal combustion engine. When such air filters are used in a particularly dirty atmosphere the filter media will become clogged very quickly and thus will not allow air to pass therethrough. Also if the dirt and dust particles are large and/or sharp the filter media may be torn or cut, thus losing efficiency. In such instances as set forth above, the filter media will have to be renewed or cleaned very often with consequent cutting off of the engine on which the filter is mounted, thus removing the engine or piece of equipment from service.

The invention herein surrounds the filter media with a deflector for the air entering the housing which deflector causes the air to assume a swirling action or flow whereby the large or heavy dirt and dust particles are separated from the air by such action before the air passes through the filter media thus prolonging the life of the filter media or preventing an early clogging or cutting and tearing of the filter media. The deflector is so shaped and spaced from the filter media that substantially the entire filter media is available to the air flow.

Thus it is an object of the invention to prolong the life of an air filter media by placing an air deflector in the housing and surrounding the filter media so that the heavy dirt and dust particles in the incoming air are caused to be separated from the air by swirling action.

It is a further object that the air deflector be formed of one piece metal and be either a permanent part of the housing or mounted on the filter media as the end cap thereof.

With these objects in mind, embodiments of the invention are shown in the accompanying drawings which are a part of the application and in which:

FIG. 1 is a perspective view of the filter media with the air deflector mounted thereon as an end cap thereof;

FIG. 2 is a cross-sectional view of the filter media taken on line 2—2 of FIG. 1 and showing it in a housing;

Figure 3:
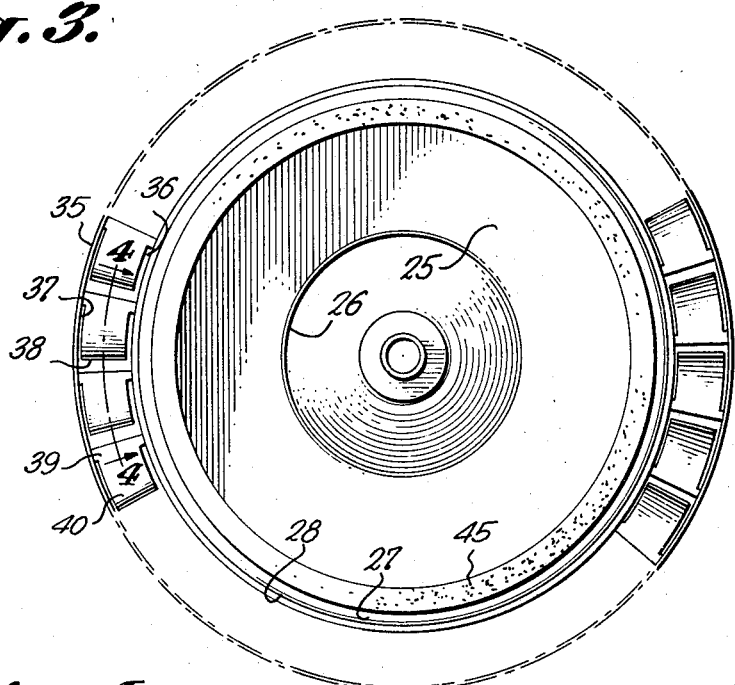
FIG. 3 is a top plan view of the filter media.

The filter unit generally designated 1 is placed within a housing generally designated 2 which has an upper portion 3 and a lower portion 4 which are held together by any appropriate means such as a clamp ring 5. The side wall 6 has near the top of the upper portion thereof an inlet 7. The top or end wall of the housing has an outlet 8 therein. The housing may be made of two or more parts which can be readily separated for the removal and insertion of the filter unit as shown. The bottom of the housing is formed into a sump 9 to collect the dust particles as will be explained hereinafter. The sump is closed by a bottom or end wall 9'.

The filter unit 1 comprises a filter media 10 which is made of pleated paper that may or may not be treated with a moisture resistant material. Inside of the pleated paper filter media is an inner tube 11 formed of a foraminous material such as expanded metal. The inner tube has the inner peaks of the pleats adjacent thereto. Adjacent to the outer peaks of the pleated media is an outer tube 12 also of foraminous material such as expanded metal.

The filter unit is provided with an end cap 13 at the lower part thereof. The end cap has an upstanding outer flange 14 which engages the lower part of the outer tube 12. Also an inner flange 15 is provided which engages the inner side of the inner tube 11. The inner portion 16 of the end cap extends upwardly and inwardly to provide a dome-like formation within the inner tube 11. The dome-like formation is provided with a substantially flat center portion 17 having an opening 18 therein. A bolt 19 having a head 20 is passed through the opening 18 with the head 20 engaging the flat center portion 17. Mounted within the outlet 8 is a spider 21 by welding or otherwise affixing it to the outlet 8. The center of the spider is provided with a threaded opening 22. The bolt 19 is provided with threads 23 on the end opposite to the head 20 which threads engage with the threaded opening 22 to hold the filter 1 within the housing 2 and before the portions 3 and 4 of the housing are joined together. A cement 24 is provided in the end cap 13 to seal the edges of the pleated paper filter media 10 to the end cap.

The upper end of the filter unit has an end cap 25 thereon. An inner flange 26 is provided on the end cap which inner flange is fitted against the inner tube 11 to hold the same in position. An outer flange 27 extends from the end cap 25 and is fitted tightly around the outer tube 12. At the end of the outer flange 27 there is provided an offset 28 which extends outwardly and downwardly at an angle to the flange 27. Extending downwardly from the offset and at an angle thereto is a downwardly extending skirt 29. The skirt 29 surrounds the upper portions of the filter unit 1 but is spaced outwardly therefrom to provide a channel or flow area 30 so that substantially all of the filter surface of the unit 1 is accessible to the air being filtered. Some of the dust laden air will be caused to flow into the flow area 30 and pass through the filter media 10 wherein the dust is separated therefrom.

The lower end 31 of the skirt 29 is bent outwardly and away from the filter unit 1 on bend 32 to provide an outwardly extending flange 33 and again upwardly on bend line 34 to provide an upstanding flange 35. The upstanding flange 35 engages the inner wall of upper portion 3 of the housing 2 very closely to prevent any of the air from by-passing the outwardly extending flange 33.

Arcuate cuts 36 are periodically cut on the bend 32 adjacent the meeting edge of the skirt 29 and the outwardly extending flange 33. A like series of arcuate cuts 37 are cut in the outwardly extending flange 33 at the upward bend 34 with the upstanding flange 35. The cuts 36 and 37 are each substantially the same length. A cross cut 38 is cut into the outwardly extending flange 33 and extends between one end of each of the cuts 36 and 37. Thus a three-way cut is made periodically around the outwardly extending flange 33. Between the cross cut 38 and the adjacent ends of the cuts 36 and 37 there is a left strip of the outwardly extending flange 33 as indicated at 39 and which strip is still joined to the skirt 29 and the upstanding flange 35. Formed by the three cuts 36, 37 and 38 is a tongue or blade 40 which is bent upwardly from the outwardly extending flange 33 and on the strip 39. The tongue or blade extends outwardly and upwardly with respect to the outwardly extending flange 33 on an angle which is approximately 30°. The tongues or blades 40 formed in the outwardly extending flange 33 are periodically spaced around the skirt 29 and when bent upwardly act as air deflectors to the incoming air and cause that air to swirl around in the space 41 between the filter unit 1 and the side wall 6 of the housing. The air swirling in this manner produces an action which causes any heavy dust particles or dirt to be thrown outwardly against the side wall 6 of the housing and subsequently fall to the bottom of the bottom portion 4 of the housing and pass through the apertures 42 in the plate 43 and into the sump 9 where it will be collected and from which it can be emptied when renewing or cleaning the filter unit.

The upper end cap 25 is sealed to the upper end of the pleated paper filter media 10 by means of a cement 44. Mounted between the upper end cap 25 and the end wall of the housing 2 is a gasket 45 which seals the inlet to the housing from the outlet so that no air will pass around the filter unit without first passing through the filter unit. The gasket 45 is compressed between the filter unit 1 and the end wall of the housing 2 by tightening the bolt 19 which forces the filter unit 1 against the end wall of the housing 2.

The combined end cap and air deflector is formed from a single sheet of metal stock by drawing the metal stock through several die-shaping operations to form first the end piece which ultimately forms the upper end cap 25, the outer flange 26 thereon and then the offset 28 and then the downwardly extending skirt 29 and finally bending the outwardly extending flange 33 and the upstanding flange 35. After thus forming the end cap and air deflector the opening in the center of the end cap may be cut and the inner flange 26 formed, and then the outwardly extending flange may be cut on the three cuts 36, 37 and 38 and the final operation is to have the tongue or blades 40 formed by the three cuts bent upwardly from the plane of the outwardly extending flange 33 to the approximate 30° angle with relation to the outwardly extending flange 33. It will be noted that the ends of the tongues or blades 40 extend upwardly to a point where they are substantially in a plane taken transversely of the upper edge of the upstanding flange 35.

Also the end cap and air deflector member can be formed on a stamping press from a single sheet of metal by using various dies both male and female to form the component parts as described above.

Figure 5:
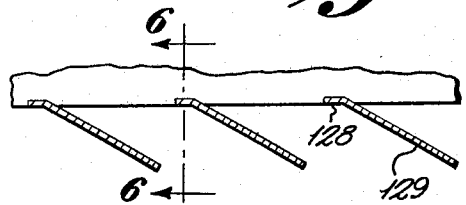
FIG. 5 is a partial cross-sectional view of a modified form of the air deflector blades.
Figure 6:
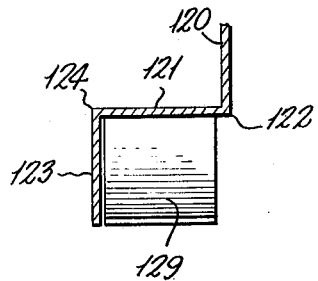
FIG. 6 is a cross-sectional view taken on line 6—6 of FIG. 5.

A modified form of the tongue or blades is shown in FIGS. 5 and 6. The downwardly extending skirt 120 has an outwardly extending flange 121 which is formed by a bend 122 and a downwardly extending flange 123 formed from the outwardly extending flange 121 by the bend 124. The tongues or blades 129 are still formed by making the same three cuts 36, 37 and 38 as described previously but instead of bending the tongues or blades 129 upwardly, there are bent downwardly from the strip 128 at the approximate angle of 30°. It will be noted that the downwardly extending tongues 129 do not extend beyond the edge of the downwardly extending flange 123.

Figure 7:
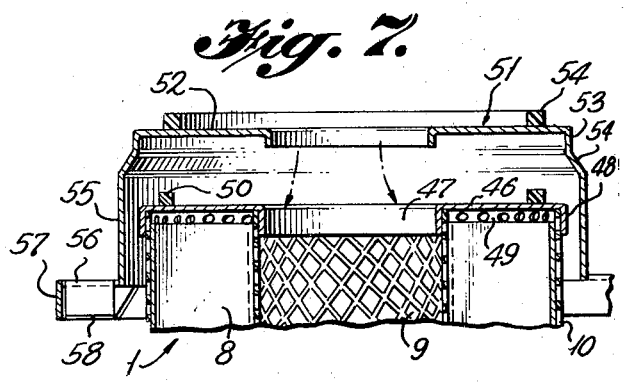
FIG. 7 is a partial cross-sectional view of a modification wherein the air deflector is separate from the filter media.

In the interest of economy the combined end cap and air deflector may be made into two component parts with the air deflector portion remaining in the housing at all times. As shown in FIG. 7, there is provided an end cap 46 for the upper end of the filter unit 1 which is provided with an internal flange 47 engaging the inner tube 11 and an external flange 48 engaging the outer tube 12. A cement 49 is provided in the end cap 46 to seal the same to the upper end of the pleated paper filter media 10. A gasket 50 is cemented to the outer surface of the end cap 46 which engages the air deflector to seal the filter unit 1 in the manner as heretofore described.

Figure 4:
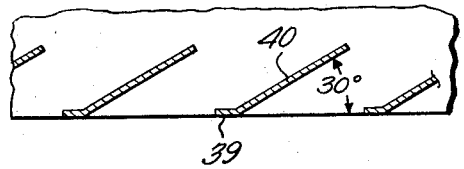
FIG. 4 is a cross-sectional view of the air deflector blades taken on line 4—4 of FIG. 3.

The air deflector generally indicated 51 is formed in the same manner as that described above and comprises the upper body portion 52 with the downwardly extending flange 53 which tightly engages the external flange 48 of the end cap 46. The offset portion 54 extends downwardly from the flange 53 and the skirt 55 extends downwardly from the offset portion 54. The end of the skirt 55 has the outwardly extending flange 56. A further downwardly extending flange 57 extends downwardly with respect to the outwardly extending flange 56. The three slits as described above are cut in the outwardly extending flange and the tongues or blades 58 are bent downwardly and outwardly with respect to the outwardly extending flange on the three slits in the same manner as described in FIGS. 5 and 6. Although it is shown in FIG. 7 that the downwardly extending flange 57 and the tongue or blades 58 are extending downwardly the same may extend in the opposite direction, that is, the flange 57 may extend upwardly with respect to the outwardly extending flange 56 and the tongues 58 may extend upwardly from that flange in the manner as shown in FIG. 4. The skirt 55 while surrounding the filter unit 1 is spaced outwardly therefrom by the offset 54 in the same manner as described heretofore with regard to the skirt 29 and the offset 28 in FIG. 2. The spacing allows substantially all of the filter surface to be available to the air being filtered. A gasket 59 is provided on the upper surface of the air deflector 51 to engage the top wall of the housing 2 to thus seal off the inlet from the outlet.

The flanges 35, 123 and 57 are in close association with the inner surface of the side wall 6 and maintain a close fit therewith. Also the flanges will conform to any out-of-roundness of the housing 2 without any damage or distortion of the blades 40, 58 and 129 while maintaining the close fit with the inner surface of the side wall 6. This also aids to hold the air deflector within the housing.

What is claimed is:

1. A circular filter unit, a circular housing therefor, the housing having upper and lower end walls and a side wall between the ends walls, an inlet in the side wall and an outlet in one of the end walls, the filter unit being in the housing, the filter unit having foraminous inner and outer tubes and a filter media between the tubes, the filter unit being adjacent the one end wall, an end cap on the lower end of the filter unit and cemented thereto, seal means between the unit and the one end wall, and being spaced from the side wall and the other end wall to provide a first flow space thereabout, holding means in the housing engaging the filter unit and holding the unit against the one end wall, a flow directing structure adjacent the one end wall and surrounding that portion of the filter unit adjacent the one end wall, the flow directing structure comprising a central portion engaging the filter unit, a downwardly extending flange at the outer portion of the central portion, said flange engaging the outer tube, an outwardly and downwardly directed offset portion extending from the end of the downwardly extending flange, a downwardly extending skirt connected to the offset portion, the skirt being spaced outwardly of the filter unit and providing a second flow space between the skirt and the filter unit, an outwardly extending annular first flange extending outwardly from the skirt at the lower end thereof, the outwardly extending first flange having a second flange at its end concentric with the lower end of the skirt, the second flange closely engaging the inner portion of the side wall in sealing engagement therewith and spacing the flow directing structure and filter unit within the housing, the first flange having flow directing blades extending therefrom at an acute angle thereto, the blades having a base portion integral with the first flange and extending upwardly therefrom, the blades being positioned below the inlet, the plane of the first flange being normal to the plane of the skirt and to the plane of the second flange, the blades extending from the first flange in the same direction as the second flange extends from the first flange, the first flange including apertures between the blades whereby fluid flowing into the housing is caused to swirl in the first flow space by the flow directing blades and causing separation of heavy particles contained in the fluid by the swirling action before the fluid passes through the filter material, thus protecting the filter material from contact by the heavy particles and the fluid with fine particles therein will pass through the outer tube throughout its entire length to engagement with the filter media where the fine particles will be removed from the fluid as it passes through the media.

2. A filter unit as set forth in claim 1 wherein the flow directing structure provides an end cap for the upper end.

3. A filter unit as set forth in claim 1 wherein the filter media is provided with end caps at both ends, the filter media being removably mounted within the flow directing structure.

4. A circular filter unit, a circular housing therefor, the housing having upper and lower end walls and a side wall between the end walls, an inlet in the side wall and an outlet in one of the end walls, the filter unit being in the housing, the filter unit having foraminous inner and outer tubes and a filter media between the tubes, the filter unit being adjacent the one end wall, an end cap on the lower end of the filter unit and cemented thereto, seal means between the unit and the one end wall, and being spaced from the side wall and the other end wall to provide a first flow space thereabout, holding means in the housing engaging the filter unit and holding the unit against the one end wall, a flow directing structure adjacent the one end wall and surrounding that portion of the filter unit adjacent the one end wall, the flow directing structure comprising a central portion engaging the filter unit, a downwardly extending flange at the outer portion of the central portion, said flange engaging the outer tube, an outwardly and downwardly directed offset portion extending from the end of the downwardly extending flange, a downwardly extending skirt connected to the offset portion, the skirt being spaced outwardly of the filter unit and providing a second flow space between the skirt and the filter unit, an outwardly extending annular first flange extending outwardly from the skirt at the lower end thereof, the outwardly extending first flange having a second flange at its end concentric with the lower end of the skirt, the second flange closely engaging the inner portion of the side wall in sealing engagement therewith and spacing the flow directing structure and filter unit within the housing, the first flange having flow directing blades extending therefrom at an acute angle thereto, the blades having a base portion integral with the first flange, and extending downwardly therefrom, the blades being positioned below the inlet, the plane of the first flange being normal to the plane of the skirt and to the plane of the second flange, the blades extending from the first flange in the same direction as the second flange extends from the first flange, the first flange including apertures between the blades whereby fluid flowing into the housing is caused to swirl in the first flow space by the flow directing blades and causing separation of heavy particles contained in the fluid by the swirling action before the fluid passes through the filter material, thus protecting the filter material from contact by the heavy particles and the fluid with fine particles therein will pass through the outer tube throughout its entire length to engagement with the filter media where the fine particles will be removed from the fluid as it passes through the media.

5. A filter unit as set forth in claim 4 wherein the flow directing structure provides an end cap for the upper end.

6. A filter unit as set forth in claim 4 wherein the filter media is provided with end caps at both ends and the filter media being removably mounted within the flow directing structure.

References Cited

UNITED STATES PATENTS

| | | | |
|---|---|---|---|
| 1,734,030 | 11/1929 | Bennett | 55—457 |
| 1,871,337 | 8/1932 | Moulding | 55—499 |
| 1,912,235 | 5/1933 | Winslow | 55—498 |
| 2,480,379 | 8/1949 | Newberry | 55—447 |
| 2,730,241 | 1/1956 | Thomas | 210—493 |
| 3,078,650 | 2/1963 | Anderson et al. | 55—456 |
| 3,111,488 | 11/1963 | Casaleggi | 210—493 |
| 3,272,336 | 9/1966 | Humbert | 210—304 |
| 3,382,651 | 5/1968 | Hahl | 210—304 |
| 3,393,497 | 7/1968 | Donnelly | 55—472 |
| 3,399,515 | 9/1968 | Hahl | 55—498 |

FOREIGN PATENTS

| | | |
|---|---|---|
| 1,278,115 | 10/1961 | France |
| 1,343,346 | 10/1963 | France |
| 511,604 | 8/1939 | Great Britain. |

HARRY B. THORNTON, Primary Examiner

B. NOZIK, Assistant Examiner

U.S. Cl. X.R.

55—457, 498, 502; 210—304